United States Patent [19]

Guebert et al.

[11] E Re. 29,979

[45] Reissued May 1, 1979

[54] DRAPERY CONNECTOR ASSEMBLY

[76] Inventors: Gerald E. Guebert, 3039 Eric La., Dallas, Tex. 75234; Raymond R. Belknap, 1949 Stemmons Freeway, Dallas, Tex. 75207

[21] Appl. No.: 834,712

[22] Filed: Sep. 19, 1977

Related U.S. Patent Documents

Reissue of:

[64] Patent No.: 3,905,414
Issued: Sep. 16, 1975
Appl. No.: 395,618
Filed: Sep. 10, 1973

U.S. Applications:

[63] Continuation of Ser. No. 711,061, Aug. 2, 1976, abandoned.

[51] Int. Cl.[2] ..... A47H 1/00

[52] U.S. Cl. ..... 160/330; 24/73 MS

[58] Field of Search ..... 160/330, 348, 383, 402, 160/368 R, 385; 24/84 B, 83, 221 R, 73 MS, 73 GS, 73 MC, 73 KM, 255 R; 248/214, 226 E, 316 D

[56] References Cited

U.S. PATENT DOCUMENTS

| | | | |
|---|---|---|---|
| 451,097 | 4/1891 | Wilkinson | 24/84 B X |
| 1,566,982 | 12/1925 | Shee | 248/214 |
| 2,491,756 | 12/1949 | Muench | 160/330 |
| 2,494,874 | 1/1950 | Hess | 160/330 |
| 3,113,677 | 12/1963 | Johnson | 248/214 X |
| 3,182,770 | 5/1965 | Shemet | 24/221 R X |
| 3,368,601 | 2/1968 | Gantert-Merz | 160/330 X |
| 3,437,127 | 4/1969 | Lukashok | 160/348 X |
| 3,540,091 | 11/1970 | Marosy | 24/221 R |
| 3,682,226 | 8/1972 | Ford | 160/330 |

FOREIGN PATENT DOCUMENTS

| | | | |
|---|---|---|---|
| 636768 | 10/1935 | Fed. Rep. of Germany | 24/84 B |

*Primary Examiner*—Phillip C. Kannan
*Attorney, Agent, or Firm*—Hubbard, Thurman, Turner, Tucker & Glaser

[57] ABSTRACT

Disclosed is a connector assembly for attaching drapery to a table, elevated platform, or the like. The assembly includes a plurality of resilient clips having generally parallel leg portions adapted to grip the edge of the item being draped, a male fastener being disposed at a face of the clip for detachable coupling with a plurality of female fasteners secured along the top edge of the drapery. In one embodiment, means are provided to temporarily lock the fasteners together.

11 Claims, 4 Drawing Figures

DRAPERY CONNECTOR ASSEMBLY

Matter enclosed in heavy brackets [ ] appears in the original patent but forms no part of this reissue specification; matter printed in italics indicates the additions made by reissue.

*This is a continuation of Application Serial No. 711,061, filed August 2, 1976, now abandoned.*

The present invention relates generally to decorative drapery systems, more particularly to drapery connector assemblies, and even more particularly to means for removably attaching drapes and trimming to tables, elevated platforms or the like.

Hotels, restaurants, and other institutions often require that its banquet tables, temporary stages, or elevated platforms or the like have some type of drapery or skirting. This skirting is normally secured or coupled in some manner to the top of the table or platform and hangs therefrom, ordinarily to a location adjacent the floor. Thus, the so draped table, for example, presents a pleasing decorative effect.

Various types of apparatus and techniques have been previously employed to secure or attach this drapery, all suffering from various disadvantages. Specifically, one commonly employed approach is to directly tack or staple the skirting to the table or platform. This not only results in damage to the drapery and/or to the surface to which they are stapled, but also provides an inconvenient, time consuming, means for applying, removing and interchanging the drapery. Furthermore, many platform stages or tables commonly employ metallic surfaces to which the drapery cannot be stapled. Alternatively, hangers or elongated holders to which the drapery is attached have been employed to removably engage the edge of the table or platform, but these have generally been of such a construction which have proven to be inconvenient and cumbersome to use.

It is a primary object of the invention to provide a new and improved drapery connector assembly.

It is a further object of the invention to provide a new and improved connector assembly for removably securing or attaching drapery to banquet tables, elevated platforms, or the like.

It is an even still further object of the invention to provide a connector assembly which is simple and inexpensive to fabricate, and allows for convenient, quick application, removal, and interchangeability of drapery or other trimming with the item to be decoratively adorned.

In accordance with these and other objects, the present invention is directed to a drapery connector assembly comprising a plurality of holders or clips spaced along, and adapted for removable coupling to, the peripheral edge of the item being draped, each of the holders having fastening means adapted to mateably and detachably couple with respective fastening means secured along the top edge of the drapery. In accordance with preferred embodiments of the assembly, each of the holders has leg portions adapted to resiliently grip the peripheral edge of a table top, for example, the leg portions uniquely transversely intersecting an outwardly directed surface portion to which one of the fasteners is joined. The mating fasteners are disposed along an elongated tape secured to the top edge of the drape. An alternate preferred embodiment temporarily locks the holders to the drapery.

These and other features, objects, and advantages of the invention will be more readily understood from the following detailed description taken in conjunction with the drawings wherein like numerals refer to corresponding parts and wherein.

The use of the term "drape" or "drapery" throughout this description generally means, and is intended to include, any type of skirting, curtains, trimming or the like formed of any type of material or fabric used for decorating or enhancing the appearance of the item to which it is coupled. Generally, the material is arranged in loose folds or pleats.

Figure 1:
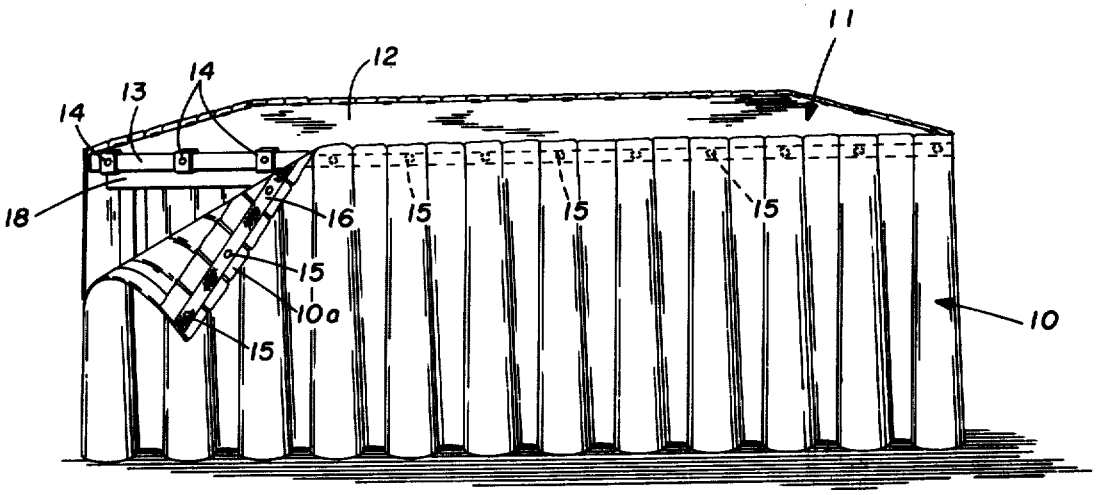
FIG. 1 illustrates the use of the drapery connector assembly of the present invention in attaching drapery to a table.

Referring initially to FIG. 1, the connector assembly of the present invention is illustrated for hanging drapery 10 from a banquet table 11 having a table top 12. While the table top has been illustrated as being of a rectangular configuration, it is understood that it can be of any desired configuration, i.e., circular, semicircular, etc. Furthermore, while the use of the connector assembly of the present invention is illustrated in FIG. 1 for draping a banquet table, this is just representative of one of the many uses of the assembly, others including, for example, the draping of permanent and temporary raised platforms or stages as well as other articles of furniture.

Disposed and spaced along the peripheral edge 13 of the table top 12, and removably coupled thereto, are a plurality of holders or clips 14 to which the drape 10 is secured, in the manner subsequently described. The clips 14, of any desired number or spacing, are firmly, but removably, coupled to the edge 13, and if desired, can be slidably translated therealong.

Disposed along and adjacent the top edge 10a of the drapery 10 are fastening members 15 adapted to mateably engage and detachably couple with the clips 14, thereby to enable the securing of the drape to the table edge. While these fastening members 15 may be attached or secured to the drapery 10 in any manner, in accordance with a feature of the present invention, they are permanently attached thereto by being joined to an elongated strip of tape 16 secured in any suitable or appropriate manner, as by sewing for example, at the top edge of the drapery 10. In accordance with a preferred form of construction, the strip 16 is fabricated as a woven nylon tape approximately 1 to 2 inches in width, the fasteners 15 being disposed approximately 8 inches apart.

Figure 2:
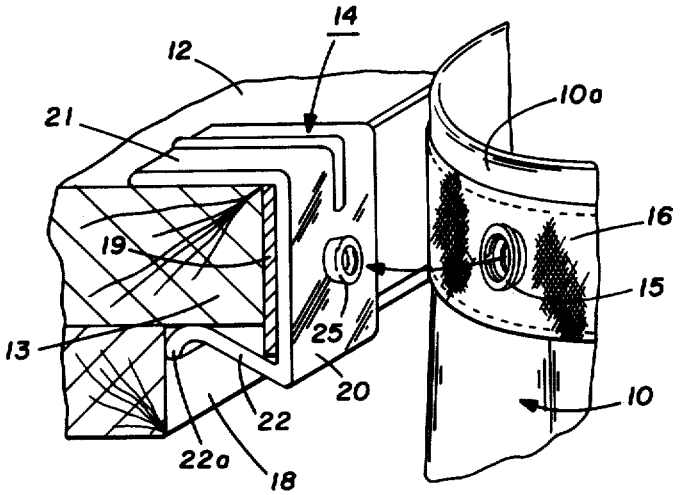
FIG. 2 depicts, in detail, a first preferred embodiment of the component parts of the connector assembly and their interrelationship with one another and to the surface to which the assembly is removably coupled.
Figure 3:
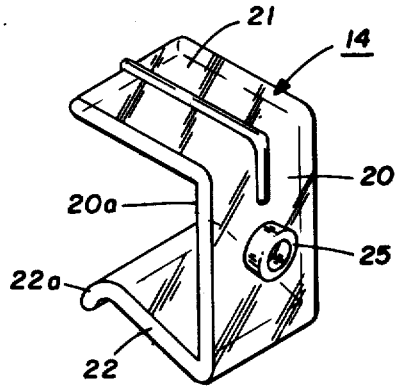
FIG. 3 illustrates the resilient clip or holder shown in FIG. 2.

Referring now to FIGS. 2 and 3, each of the connector clips 14 includes a face portion 20 and a pair of transversly extending legs 21 and 22 extending therefrom for resiliently engaging the table edge 13, in the manner illustrated in FIG. 2. The leg 22 includes a curved end portion 22a adapted to abut against the face of the recessed apron 18 of the table top. The connector clip 14, and particularly the transversely extending legs 21 and 22, are preferably formed of a resilient plastic material, for example polycarbonate, and can be fabricated, for example, by injection molding.

While the holder or clip 14 may be formed of any shape or size consistent with the broad teachings of the present invention, in accordance with a feature thereof, it is preferably formed in the shape illustrated in FIG. 3. Specifically, the leg 22 is angularly disposed (preferably at a 45° angle) with the face 20 not only to assist the resilient clamping action against the table edge 13, but also to enable the clip 14 to fit over the drop molding 19, and then clamped onto the table edge 13 in the manner illustrated in FIG. 2. Furthermore, the distance between the front face 20 and the curved portion 22a is such as to allow the curved portion 22a to abut the apron 18 while the inner surface 20a of the face portion 20 is flush against the surface of the edge 13 (or drop molding 19). Additionally, each clip 14 is fabricated so that the length of the face 20 (and therefore the vertical distance between the leg 21 and the curved portion 22a) is, in each instance, such as to allow the clip 14 to clamp on edges 13 of varying widths. Alternatively, the angle of intersection of the leg 22 with face 20 can be varied to allow for such variations in edge widths.

Disposed at each face 20, and extending outwardly therefrom, is a male connector extension 25 adapted to be received within, and be detachably coupled with, one of the female fasteners 15 secured to the tape 16. Each of the clips 14 are spaced from one another along the table edge 13 corresponding to the distance between the female fasteners 15 so that the drape 10 may be quickly and conveniently attached to the table top by merely pressing the fasteners 25 and 15 together. It is to be understood that the specific construction of the male and female fasteners 25 and 15 is not critical to the invention, it only being necessary that they be of a construction to enable detachable coupling. Additionally, it is apparent that, if desired, the female fastener 15 may be part of the clip 14, and the male fastener 25 may be secured to the tape 16.

The drape connector assembly, as thus described, offers many advantages. First, since the clip 14 removably clamps to the table edge 13, there is no need to tack or staple the drape to the table, thus preventing damage thereto. Secondly, the drapery may be conveniently applied, removed, and interchanged with a minimum of effort and time. Additionally, there is no necessity for altering or modifying the table top to provide a means for securing the drapery thereto. Furthermore, by marketing a drape connector assembly including the clip 14 and a tape 16 to which the fasteners 15 are secured, the purchaser or user of the assembly may then merely apply the tape to drapery or curtains of its own choice and design, thereby providing custom draping for its table, stage, etc.

Figure 4:
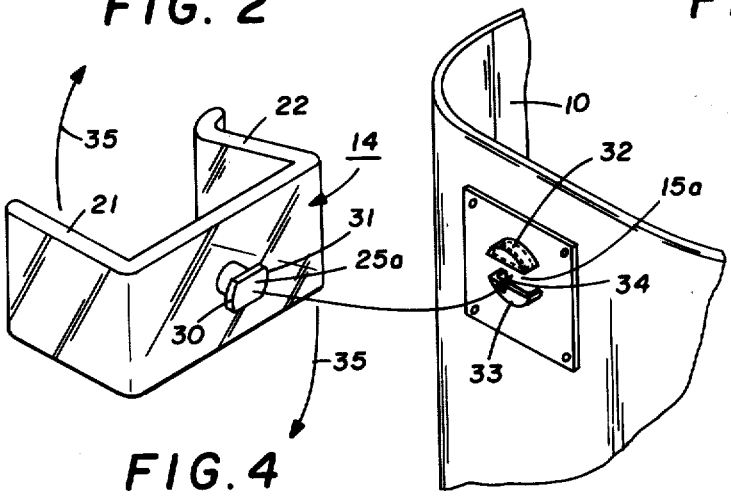
FIG. 4 illustrates an alternate preferred embodiment of the component parts of the drape connector assembly in accordance with the invention.

Referring now to FIG. 4, there is depicted an alternate preferred embodiment of the connector assembly of the present invention. Accordingly, the clip 14 includes a modified version 25a of the male connector extension as well as a modificaton 15a of the female mating fastener. Specifically, the fastener 25a includes a pair of end portions 30 and 31 adapted to be disposed behind corresponding lips 32 and 33 of the fastener 15a. Thus, by inserting the fastener 25a into the spaced portion 34 of the fastener 15a and then rotating the former in the direction of the arrows 35, the corresponding connectors may be locked or secured together. The drapery is then applied to the edge of the table or platform by pressing the clips 14 on the edge thereof, as previously described. Then, when the drape 10 is to be removed from the table, it is merely pulled away from the edge 13, the clips 14 disengaging from this edge and remaining attached to the drapery itself. Later, if desired, the clips 14 may be removed from the drape merely by rotating the clips out of locking engagement with the fastener 15a.

While the connector assembly has been specifically described with reference to decorating a table, it is equally applicable to decorating or hanging a drape from a raised platform used as a stage. In this instance, the resilient clips can be applied directly to the edge of the platform or, alternatively, may be applied to elongated bars (often referred to as "drapery hanger bars") which are secured along the periphery of the raised platforms or stages.

Various modifications of the disclosed embodiments as well as additional embodiments may become apparent to those skilled in the art after reviewing the foregoing description without departing from the spirit and scope of the invention as defined by the following claims.

What is claimed is:

1. An assembly for draping a table, stage, or the like of the type having a peripheral edge and a recessed apron, said assembly comprising:

a. a plurality of clips resiliently and slidably clamped onto and along said peripheral edge, each of said clips comprising a face portion with a first fastener means disposed at the outer surface of said face portion, and upper and lower leg portions transversely intersecting said face portion, said lower leg portion having its end terminating in a curvilinear portion;

b. each of the said clips clamping said peripheral edge in a manner whereby the inner surface of the upper leg portion and the inner surface of the face portion is against the top and front surfaces, respectively, of the peripheral edge and the said curvilinear portion simultaneously abuts against the recessed apron and the underside surface of the peripheral edge; and c. drapery means having a plurality of second fastener means for detachable coupling with respective ones of said first fastener means of said clips.

2. The assembly as defined by claim 1 wherein the lower leg portion is disposed at an approximately 45° angle to said face portion.

3. The assembly as defined by claim 2 wherein said second fastener means are disposed along an elongated strip secured to said drape, said first fastener means comprises a male fastener and said second fastener means comprise female fasteners.

4. The connector means as defined by claim 2 wherein means are provided for temporarily locking said first and second fastener means together.

*5. An assembly for draping a structure having a top surface and an underside surface and a peripheral edge, said assembly comprising:*

*a. a plurality of clips resiliently and slideably clamped onto and along said peripheral edge, each of said clips comprising a face portion with a first fastener means disposed at the outer surface of said face portion, and upper and lower leg portions transversely intersecting said face portion with the inner surface of said upper*

*leg portion being at approximately a right angle to the inner surface of said face portion;*

*b. each of said clips clamping said structure in a manner whereby the inner surface of the upper leg portion and the inner surface of the face portion of the clips are against a portion of the top surface and peripheral edge surface, respectively, of the structure and said lower leg portion simultaneously abutts against the underside surface of the structure at a point removed from said peripheral edge; and*

*c. drapery means having a plurality of second fastener means for detachable coupling with respective ones of said first fastener means of said clips.*

*6. The assembly as defined in claim 5 wherein said second fastener means are disposed along an elongated strip secured to said drapery means, said first fastener means comprises a male fastener and said second fastener means comprises a female fastener.*

*7. The assembly means as defined by claim 5 wherein means are provided for temporarily locking said first and second fastener means together.*

*8. The assembly as defined in claim 5 wherein said lower leg portion has an end terminating in a curvilinear portion and said curvilinear portion abutts against the underside surface of said structure at a point removed from said peripheral edge.*

*9. A connector assembly for attachment of drapery to a structure having a top surface and an underside surface and a peripheral edge, said connector assembly being resiliently and slideably clamped onto and along said peripheral edge, said structure comprising:*

*a. a face portion and upper and lower leg portions intersecting said face portion, with the inner surface of said upper leg portion being at approximately a right angle to the inner surface of said face portion and clamping said peripheral edge in a manner whereby the inner surface of said upper leg portion and the inner surface of said face portion of said connector assembly are against a portion of the top surface and said periheral edge surface, respectively, and the said lower leg portion simultaneously abutts against the underside surface of said structure at a point removed from said peripheral edge; and*

*b. fastener means disposed on the outer surface of said face portion for detachable coupling with respective fastener means affixed to said drapery.*

*10. The connector assembly as defined in claim 9 wherein said lower leg portion has an end terminating in a curvilinear portion and said curvilinear portion is adapted to abutt against the underside surface of said structure at a point removed from said peripheral edge.*

*11. The connector assembly as defined in claim 9 wherein said fastener means disposed on the outer surfaces of said face portion is a male fastener adapted to temporarily lock into a female fastener means affixed to a drapery.*

* * * * *